United States Patent
Sun et al.

(10) Patent No.: US 9,720,150 B2
(45) Date of Patent: Aug. 1, 2017

(54) COLOR-FILM SUBSTRATES AND LIQUID CRYSTAL DEVICES

(71) Applicant: Wuhan China Star Optoelectronics Technology Co., Ltd., Wuhan, Hubei (CN)

(72) Inventors: Haiyan Sun, Guangdong (CN); De-Jiun Li, Guangdong (CN); Yuejun Tang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 84 days.

(21) Appl. No.: 14/759,903

(22) PCT Filed: May 22, 2015

(86) PCT No.: PCT/CN2015/079563
§ 371 (c)(1),
(2) Date: Jul. 8, 2015

(87) PCT Pub. No.: WO2016/173022
PCT Pub. Date: Nov. 3, 2016

(65) Prior Publication Data
US 2016/0341856 A1    Nov. 24, 2016

(30) Foreign Application Priority Data
Apr. 30, 2015 (CN) .......................... 2015 1 0222696

(51) Int. Cl.
*G02B 5/22*    (2006.01)
*G02F 1/1335*  (2006.01)
*G02B 5/20*    (2006.01)

(52) U.S. Cl.
CPC ............... *G02B 5/201* (2013.01); *G02B 5/22* (2013.01); *G02F 1/133514* (2013.01); *G02F 2201/52* (2013.01)

(58) Field of Classification Search
CPC ......... G02F 1/133514; G02F 1/122516; G02F 1/133512

(Continued)

(56) References Cited

U.S. PATENT DOCUMENTS 5,008,166 A * 4/1991 Aoki ................. G02F 1/133516
                                                  257/E31.121
8,755,017 B2 * 6/2014 Chen ................. G02F 1/133371
                                                  349/153

(Continued)

FOREIGN PATENT DOCUMENTS

CN    202330949 U    7/2012
CN    102654674 A    9/2012

(Continued)

*Primary Examiner* — Audrey Y Chang
(74) *Attorney, Agent, or Firm* — Andrew C. Cheng

(57) ABSTRACT

A color-film substrate and a liquid crystal device are disclosed. The color-film includes a substrate body and a color filter layer on the substrate body. The color filter layer includes duplicated color filter elements arranged in a sequence, and the color filter layer includes a first display area and a second display area arranged in a rim of the first display area. A thickness of the color filter elements of the second display area is larger than a thickness of the photoresistor of the first display area such that a transmission rate of the display panel corresponding to the second display area is smaller than the transmission rate of the display panel corresponding to the first display area. In this way, the transmission rate of edges of the display panel is reduced and the light leakage problem can be overcome such that the uniformity of the brightness is enhanced.

12 Claims, 2 Drawing Sheets

(58) Field of Classification Search
USPC .................. 349/106–109, 153; 359/885, 891
See application file for complete search history.

(56) References Cited

U.S. PATENT DOCUMENTS

2007/0287079 A1    12/2007  Li et al.
2010/0149466 A1*   6/2010   Yi ..................... G02F 1/133512
                                                    349/106

FOREIGN PATENT DOCUMENTS

CN         103018951 A      4/2013
KR         20080046935 A    5/2008

* cited by examiner

COLOR-FILM SUBSTRATES AND LIQUID CRYSTAL DEVICES

BACKGROUND OF THE INVENTION

1. Field of the Invention

The present disclosure relates to liquid crystal technology, and more particularly to a color-film substrate and a liquid crystal device (LCD).

2. Discussion of the Related Art

Currently, LCDs include a horizontal-orientation mode and a vertical-orientation mode. The conventional horizontal-orientation mode may include In-Plane Switching (IPS) and Advanced Super Dimension Switch (ADS). With respect to the horizontal-orientation LCDs, such as IPS and ADS, light leakage may occur due to cell gap issue in a normal black mode. Thus, how to solve the light leakage issue caused by bad uniformity is a critical issue.

SUMMARY

The object of the invention is to provide a color-film substrate and a LCD to improve the light leakage issue so as to enhance the uniformity of the display panel.

In one aspect, a color-film substrate includes: a substrate body and a color filter layer on the substrate body, the color filter layer comprises color filter elements having at least one of red color filter element, green color filter element, and blue color filter element arranged in a sequence, the color filter layer comprises a first display area and a second display area arranged in a rim of the first display area; wherein a thickness of the color filter elements of the second display area is larger than a thickness of the color filter elements of the first display area such that a transmission rate of the display panel corresponding to the second display area is smaller than the transmission rate of the display panel corresponding to the first display area; wherein the first display area is rectangular-shaped, and two second display areas being arranged at two sides of the first display area along a first direction; and wherein the thickness of the color filter elements in the second display area gradually decreases along a direction from the second display area toward the first display area.

Wherein a width of each of the second display area is in a range between 5% and 10% of the width of the display panel in the first direction.

In another aspect, a color-film substrate includes: a substrate body and a color filter layer on the substrate body, the color filter layer comprises color filter elements having at least one of red color filter element, green color filter element, and blue color filter element arranged in a sequence, the color filter layer comprises a first display area and a second display area arranged in a rim of the first display area; and wherein a thickness of the color filter elements of the second display area is larger than a thickness of the color filter elements of the first display area such that a transmission rate of the display panel corresponding to the second display area is smaller than the transmission rate of the display panel corresponding to the first display area.

Wherein the thickness of the color filter elements of the second display area and the thickness of the color filter elements of the first display area satisfy the equation:

$$0 < e^{-K(l_s - l_m)} < 1$$

K represents an absorption coefficient of material, $L_m$ represents the thickness of the color filter elements of the first display area, and $L_s$ represents the thickness of the color filter elements of the second display area.

Wherein the first display area is rectangular-shaped, and two second display areas are arranged at two sides of the first display area along the first direction.

Wherein a width of each of the second display area is in a range between 5% and 10% of the width of the display panel in the first direction.

Wherein the first display area is rectangular-shaped, and two second display areas are arranged at two sides of the first display area along a first direction, two second display areas are arranged at two sides of the first display area along a second direction, and the second direction is perpendicular to the first direction.

Wherein a width of each of the second display area is in a range between 5% and 10% of the width of the display panel in the first direction, and wherein the width of each of the second display area is in a range between 5% and 10% of the width of the display panel in the second direction.

Wherein the thickness of the color filter elements in the second display area gradually decreases along a direction from the second display area toward the first display area.

Wherein the thickness of the color filter elements of the second display area is decreased gradually along a direction toward the first display area so as to be an arc-shaped transition.

Wherein an thicker portion between the color filter elements of the second display area and the color filter elements of the first display area is filled by coating or injek.

In another aspect, a liquid crystal device includes: a color-film substrate comprises a substrate body and a color filter layer on the substrate body, the color filter layer comprises color filter elements having at least one of red color filter element, green color filter element, and blue color filter element in a sequence, the color filter layer comprises a first display area and a second display area arranged in a rim of the first display area; wherein a thickness of the color filter elements of the second display area is larger than a thickness of the color filter elements of the first display area such that a transmission rate of the display panel corresponding to the second display area is smaller than the transmission rate of the display panel corresponding to the first display area.

Wherein the thickness of the color filter elements of the second display area and the thickness of the color filter elements of the first display area satisfy the equation:

$$0 < e^{-K(l_s - l_m)} < 1$$

wherein K represents an absorption coefficient of material, $L_m$ represents the thickness of the color filter elements of the first display area, and $L_s$ represents the thickness of the color filter elements of the second display area.

Wherein the first display area is rectangular-shaped, and two second display areas are arranged at two sides of the first display area along the first direction.

Wherein a width of each of the second display area is in a range between 5% and 10% of the width of the display panel in the first direction.

Wherein the first display area is rectangular-shaped, and two second display areas are arranged at two sides of the first display area along a first direction, two second display areas are arranged at two sides of the first display area along a second direction, and the second direction is perpendicular to the first direction.

Wherein a width of each of the second display area is in a range between 5% and 10% of the width of the display panel in the first direction, and wherein the width of each of the second display area is in a range between 5% and 10% of the width of the display panel in the second direction.

Wherein the thickness of the color filter elements in the second display area gradually decreases along a direction from the second display area toward the first display area.

Wherein the thickness of the color filter elements of the second display area is decreased gradually along a direction toward the first display area so as to be an arc-shaped transition.

Wherein an thicker portion between the RGB color filter elements of the second display area and the color filter elements of the first display area is filled by coating or injek.

In view of the above, a thickness of the color filter elements of the second display area is larger than a thickness of the color filter elements of the first display area. The second display area is arranged in a rim of the first display area such that a transmission rate of the display panel corresponding to the second display area is smaller than the transmission rate of the display panel corresponding to the first display area. As such, a transmission rate of the display panel corresponding to the second display area is smaller than the transmission rate of the display panel corresponding to the first display area. Thus, the transmission rate of edges of the display panel is reduced and the light leakage problem can be overcome such that the uniformity of the brightness is enhanced.

DETAILED DESCRIPTION OF THE EMBODIMENTS

Embodiments of the invention will now be described more fully hereinafter with reference to the accompanying drawings, in which embodiments of the invention are shown.

Figure 1:
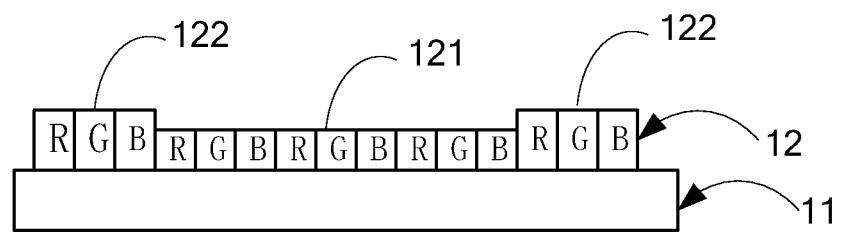
FIG. 1 is a cross-sectional view of the color-film substrate in accordance with a first embodiment.

FIG. 1 is a cross-sectional view of the color-film substrate in accordance with a first embodiment. As shown in FIG. 1, the color-film substrate includes a substrate body 11 and a color filter layer 12 arranged on the substrate body 11. The color filter layer 12 includes RGB color filter elements having at least one of red color filter element, green color filter element, and blue color filter element arranged in a sequence.

Figure 2:
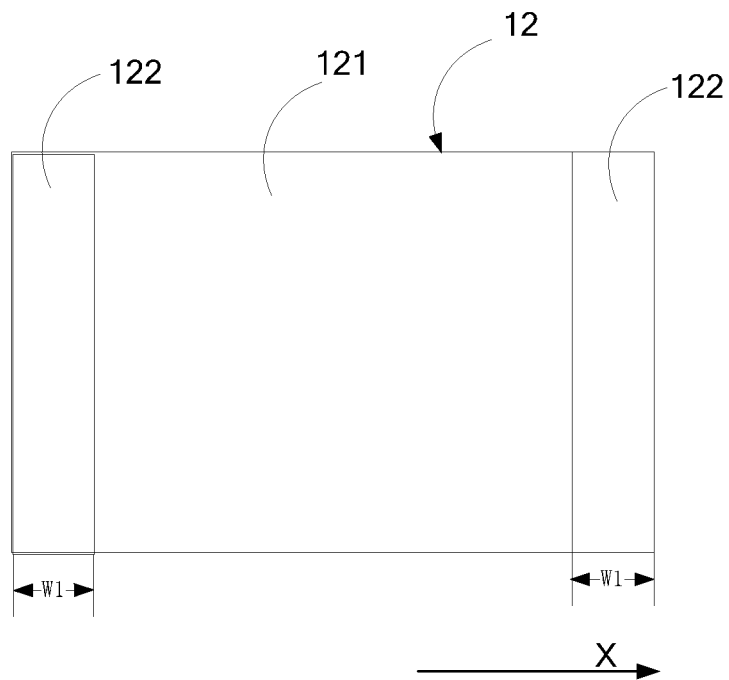
FIG. 2 is a schematic view of the color filter layer of the color-film substrate of FIG. 1.

FIG. 2 is a schematic view of the color filter layer of the color-film substrate of FIG. 1. The color filter layer 12 includes a first display area 121 and a second display area 122 arranged in a rim of the first display area 121.

In an example, the first display area 121 is rectangular-shaped, and two second display areas 122 are arranged at two sides of the first display area 121 along a first direction (X). In the first direction (X), a width of each of the second display area 122 (W1) is configured to be in a range between 5% and 10% of the width of the display panel. It is to be noted that the width of the two second display area 122 may be the same or different.

The transmission rate of the IPS display panel may be calculated by the equation below:

$$L_1(\lambda) = T(\lambda) \cdot L_0(\lambda)$$

$$T(\lambda) = T_{DownPolarizerIsotropicLight}(\lambda) \cdot T_{ArrayGlass}(\lambda) \cdot \eta_{Aperature\ rate} \cdot$$
$$T_{LC}(\lambda) \cdot \eta_{LC}(\lambda) \cdot T_{CFglass}(\lambda) \cdot T_{UpPolarizerPolarizedLight}(\lambda)$$
$$= T_{CFglass}(\lambda) \cdot \chi$$

$$T_{CFglass}(\lambda) \propto \frac{1}{THK_{RGB}}$$

Wherein $L_1(\lambda)$ represents an emitting-brightness of the panel, $L_0(\lambda)$ represents a backlight brightness, $T(\lambda)$ represents an overall transmission rate, $\chi$ represents other factors, and $THK_{RGB}$ represents a thickness of the RGB color filter elements.

In view of the above equation, it can be understood that the increase of the $THK_{RGB}$ results in a decrease of the $T_{CF\ Glass}(\lambda)$. As such, the $T(\lambda)$ of the area corresponding to the RGB color filter elements is decreased.

In addition, a light absorption equation corresponding to IPS liquid crystal display panel of different materials and different thicknesses is:

$$I = I_0 * e^{-Kl}$$

Wherein I represents a strength of the emission light beams, $I_0$ represents a strength of the incident light beams, K represents the absorption coefficient of the material, and L represents a thickness of the color filter elements.

As the transmission rate of the second display area is lower than that of the first display area, the equation below may be obtained.

$$0 < \frac{I_s}{I_m} = \frac{I_0 * e^{-Kl_s}}{I_0 * e^{-Kl_m}} < 1$$

Wherein $I_s$ represents a brightness of the second display area, $I_m$ represents a brightness of the first display area, $L_s$ represents a thickness of the color filter elements of the second display area, and the $L_m$ represents the thickness of the color filter elements of the first display area.

The relationship between $L_s$ and $L_m$ is shown as below:

$$0 < e^{-K(l_s - l_m)} < 1$$

Thus, in the first embodiment, $L_s$ of the second display area 122 is higher than $L_m$ of the first display area 121. At the same time, the $L_s$ of the second display area 122 and the $L_m$ of the first display area 121 satisfy the equation: $0 < e^{-K(l_s - l_m)} < 1$. As such, the transmission rate of the display panel corresponding to the second display area 122 is smaller than the transmission rate of the display panel corresponding to the first display area 121. In this way, the mura effect caused by the difference of the thickness of the liquid crystal cell may be overcome so as to enhance the uniformity of the brightness.

In the first embodiment, the RGB color filter elements of the first display area 121 is of the same thickness, and the RGB color filter elements of the second display area 122 is of the same thickness. In addition, the width of the RGB color filter elements of the second display area 122 is greater than that of the RGB color filter elements of the first display area 121.

The thicker portion between the RGB color filter elements of the second display area 122 and that of the first display area 121 may be produced by coating or injek. For instance, a mask process is applied to the first display area 121.

Afterward, by controlling operations of a brush or a spray nozzle, the thickness of the RGB color filter element of the second display area 122 is increased. For instance, the speed of the brush/spray nozzle and the amount of the material to be brushed/sprayed are controlled.

One pixel of the liquid crystal panel corresponds to the color filter elements of three colors. That is, one pixel corresponds to red, green, and blue color filter elements. The RGB color filter elements correspond to the same pixel may be respectively arranged in the first display area 121 and the second display area 122. For instance, The R color filter element and the G color filter element correspond to the same pixel are arranged in the first display area 121, and the G p-color filter element correspond to the same pixel is arranged in the second display area 122. In another example, the R color filter element correspond to one pixel is arranged in the first display area 121, and G and B color filter elements correspond to the same pixel are arranged in the second display area 122. In another example, the R-color filter element corresponds to one pixel and a portion of the G color filter element corresponds to the same pixel are arranged in the first display area 121, and the remaining portion of the G color filter element and the B color filter element are arranged in the second display area 122. Preferably, the RGB color filter elements corresponds to the same pixel may be arranged in the first display area 121 or in the second display area 122 at the same time.

Figure 3:
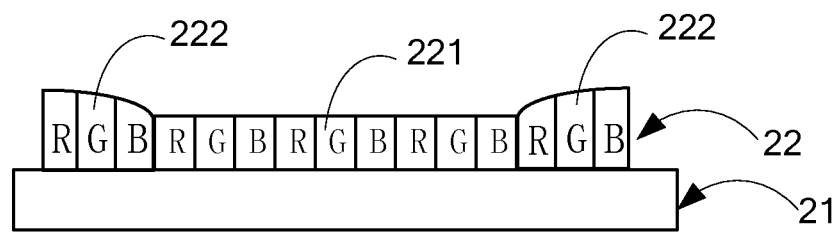
FIG. 3 is a cross-sectional view of the color-film substrate in accordance with a second embodiment.

FIG. 3 is a cross-sectional view of the color-film substrate in accordance with a second embodiment. The color-film substrate includes a substrate body 21 and a layer 22 on the substrate body 21. The layer 22 includes RGB color filter elements having at least one of red color filter element, green color filter element, and blue color filter element arranged in a sequence.

Figure 4:
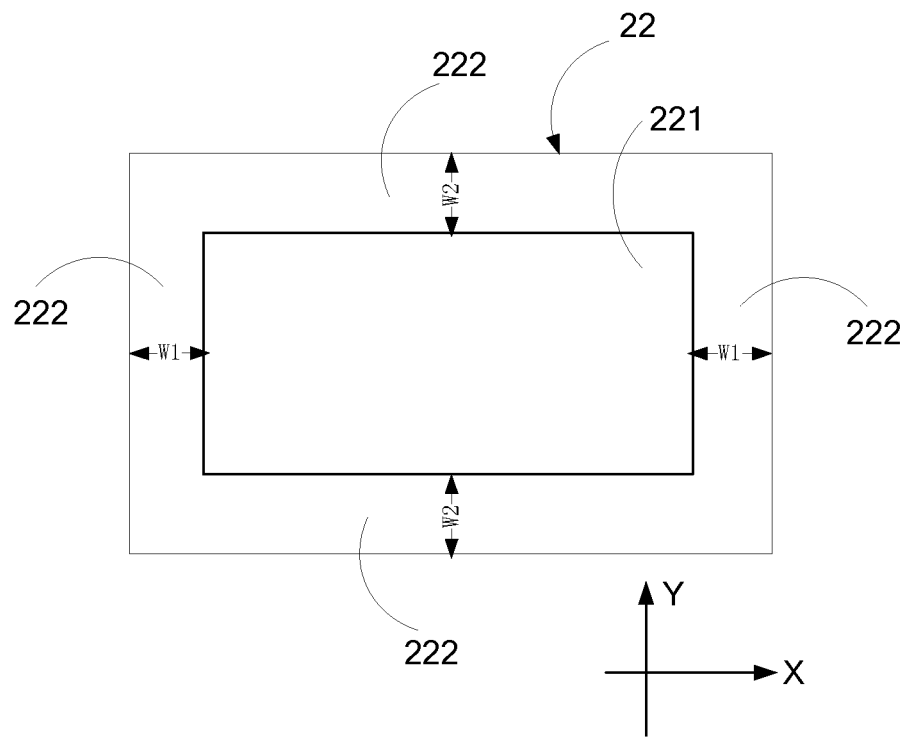
FIG. 4 is a schematic view of the color filter layer of the color-film substrate of FIG. 3.

FIG. 4 is a schematic view of the color filter layer of the color-film substrate of FIG. 3. The color filter layer 22 includes a first display area 221 and a second display area 222 arranged in a rim of the first display area 221.

In an example, the first display area 221 is rectangular-shaped, and two second display areas 222 are arranged at two sides of the first display area 221 along a first direction (X). Two second display areas 222 are arranged at two sides of the first display area 221 along a second direction (Y), and the second direction (Y) is perpendicular to the first direction (X).

In the first direction (X), a width of each of the second display area 222 (W1) is configured to be in a range between 5% and 10% of the width of the display panel. In the second direction (Y), the width of each of the second display area 222 (W2) is configured to be in a range between 5% and 10% of the width of the display panel. It is to be noted that the width of the two second display area 122, along the first direction (X) or along the second direction (Y), may be the same or different.

In the second embodiment, the thickness of the color filter element of the second display area 222 is greater than the thickness of the color filter element of the first display area 221. The $L_s$ of the second display area 222 and the $L_m$ of the first display area 221 satisfy the equation: $0 < e^{-K(l_s - l_m)} < 1$. As such, the transmission rate of the display panel corresponding to the second display area 222 is smaller than the transmission rate of the display panel corresponding to the first display area 221.

Specifically, the RGB color filter elements of the first display area 221 is of the same thickness, and the RGB color filter elements of the second display area 222 is of different thickness. The thickness of the RGB color filter element in the second display area 222 gradually decreases along a direction from the second display area 222 toward the first display area 221. Preferably, the thickness of the RGB color filter elements of the second display area 222 is decreased gradually along a direction toward the first display area 221 so as to be an arc-shaped transition as shown in FIG. 3.

The thicker portion between the RGB color filter elements of the second display area 122 and that of the first display area 221 may be produced by coating or injek.

The RGB color filter elements corresponds to the same pixel may be respectively arranged in the first display area 221 or in the second display area 222 at the same time. In another example, all of the RGB color filter elements corresponds to the same pixel may be arranged in the first display area 221 or in the second display area 222.

In an example, a LCD includes the above-mentioned color-film substrate.

In view of the above, the thickness of the color filter element of the second display area is greater than the thickness of the color filter element of the first display area. The second display area is arranged in the rim of the first display area. As such, a transmission rate of the display panel corresponding to the second display area is smaller than the transmission rate of the display panel corresponding to the first display area. In this way, the mura effect caused by the non-uniform thickness of the liquid crystal cell may be overcome so as to enhance the uniformity of the brightness.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A color-film substrate, comprising:
   a substrate body and a color filter layer on the substrate body, the color filter layer comprises color filter elements having at least one of red color filter element, green color filter element, and blue color filter element arranged in a sequence, the color filter layer comprises a first display area and a second display area arranged in a rim of the first display area; and
   wherein a thickness of the color filter elements of the second display area is larger than a thickness of the color filter element of the first display area such that a transmission rate of the display panel corresponding to the second display area is smaller than the transmission rate of the display panel corresponding to the first display area;
   wherein the thickness of the color filter elements in the second display area gradually decreases along a direction from the second display area toward the first display area.

2. The color-film substrate as claimed in claim 1, wherein the thickness of the color filter elements of the second display area and the thickness of the color filter elements of the first display area satisfy the equation:

$$0 < e^{-K(l_s - l_m)} < 1$$

K represents an absorption coefficient, $L_m$ represents the thickness of the color filter elements of the first display area, and $L_s$ represents the thickness of the color filter elements of the second display area.

3. The color-film substrate as claimed in claim 2, wherein a width of each of the second display area is in a range between 5% and 10% of the width of the display panel in the first direction.

4. The color-film substrate as claimed in claim 1, wherein the first display area is rectangular-shaped, and two second display areas are arranged at two sides of the first display area along a first direction, two second display areas are arranged at two sides of the first display area along a second direction, and the second direction is perpendicular to the first direction.

5. The color-film substrate as claimed in claim 4, wherein a width of each of the second display area is in a range between 5% and 10% of the width of the display panel in the first direction, and wherein the width of each of the second display area is in a range between 5% and 10% of the width of the display panel in the second direction.

6. The color-film substrate as claimed in claim 1, wherein the thickness of the color filter elements of the second display area is configured to be thicker than the thickness of the color filter elements of the first display area by coating or injek.

7. A liquid crystal device, comprising:
a color-film substrate comprises a substrate body and a color filter layer on the substrate body, the color filter layer comprises color filter elements having at least one of red color filter element, green color filter element, and blue color filter element arranged in a sequence, the color filter layer comprises a first display area and a second display area arranged in a rim of the first display area;
wherein a thickness of the color filter elements of the second display area is larger than a thickness of the color filter element of the first display area such that a transmission rate of a display panel corresponding to the second display area is smaller than the transmission rate of the display panel corresponding to the first display area;

wherein the thickness of the color filter elements in the second display area gradually decreases along a direction from the second display area toward the first display area.

8. The liquid crystal device as claimed in claim 7, wherein the thickness of the color filter elements of the second display area and the thickness of the color filter elements of the first display area satisfy the equation:

$$0 < e^{-K(l_s - l_m)} < 1$$

wherein K represents an absorption coefficient of material, $L_m$ represents the thickness of the color filter elements of the first display area, and $L_s$ represents the thickness of the color filter elements of the second display area.

9. The liquid crystal device as claimed in claim 8, wherein a width of each of the second display area is in a range between 5% and 10% of the width of the display panel in the first direction.

10. The liquid crystal device as claimed in claim 7, wherein the first display area is rectangular-shaped, and two second display areas are arranged at two sides of the first display area along a first direction, two second display areas are arranged at two sides of the first display area along a second direction, and the second direction is perpendicular to the first direction.

11. The liquid crystal device as claimed in claim 10, wherein a width of each of the second display area is in a range between 5% and 10% of the width of the display panel in the first direction, and wherein the width of each of the second display area is in a range between 5% and 10% of the width of the display panel in the second direction.

12. The liquid crystal device as claimed in claim 7, wherein the thickness of the color filter elements of the second display area is configured to be thicker than the thickness of the color filter elements of the first display area by coating or injek.

\* \* \* \* \*